(12) United States Patent
Fanto et al.

(10) Patent No.: US 12,468,087 B2
(45) Date of Patent: Nov. 11, 2025

(54) APPARATUS AND METHODS FOR REDUCTION OF CROSSTALK IN INTEGRATED PHOTONICS APPLIED TO ADDRESSING QUANTUM MEMORIES

(71) Applicant: Government of the United States as represented by the Secretary of the Air Force, Rome, NY (US)

(72) Inventors: Michael L. Fanto, Rome, NY (US); David Hucul, Fayette, NY (US); Stefan Preble, Pittsford, NY (US); Amos M. Smith, Chittenango, NY (US); Zachary Smith, Clinton, NY (US); Kathy-Anne Soderberg, Manilus, NY (US); Christopher Tison, Rome, NY (US)

(73) Assignee: United States of America as represented by the Secretary of the Air Force, Rome, NY (US)

( * ) Notice: Subject to any disclaimer, the term of this patent is extended or adjusted under 35 U.S.C. 154(b) by 303 days.

(21) Appl. No.: 18/191,013

(22) Filed: Mar. 28, 2023

(65) Prior Publication Data

US 2024/0329303 A1    Oct. 3, 2024

(51) Int. Cl.
  *G02B 6/12*    (2006.01)
  *G02B 6/122*   (2006.01)
  *G02B 6/136*   (2006.01)

(52) U.S. Cl.
  CPC ............. *G02B 6/122* (2013.01); *G02B 6/136* (2013.01)

(58) Field of Classification Search
  CPC ................................ G02B 6/122; G02B 6/136
  USPC ........................................................... 385/14
  See application file for complete search history.

(56) References Cited

U.S. PATENT DOCUMENTS

| | | | |
|---|---|---|---|
| 10,409,004 B2 | 9/2019 | Kulick | |
| 11,977,258 B1* | 5/2024 | Silverstein | G02B 6/13 |
| 2012/0051691 A1* | 3/2012 | Zhang | G01C 19/721 385/14 |
| 2019/0196102 A1* | 6/2019 | Rubio Guivernau | G02B 6/136 |
| 2022/0120976 A1 | 4/2022 | Palone | |
| 2022/0197102 A1 | 6/2022 | Christen | |

OTHER PUBLICATIONS

Niffenegger, R.J. et al. ,"Integrated multi-wavelength control of an ion qubit," Nature vol. 586, pp. 538-542 (2020).
Mehta, K.K. et al., "Integrated optical addressing of an ion qubit," Nature Nanotech vol. 11, pp. 1066-1070 (2016).
Mehta, K.K., "Precise and diffraction-limited waveguide-to-free-space focusing gratings," Scientific Reports 7:2019, pp. 1-8 (2017).

* cited by examiner

*Primary Examiner* — Jerry M Blevins
(74) *Attorney, Agent, or Firm* — AFRL/RI; Matthew D. Fair

(57) ABSTRACT

Apparatus and method for minimum crosstalk between waveguides via on chip filtering and scatter mitigation necessary to provide tunable addressing of atomic memories. Methods are disclosed to improve the extinction ratio between coherent optical outputs capable of selectively striking a single atom in an array of atoms confined in a trapped memory.

18 Claims, 6 Drawing Sheets

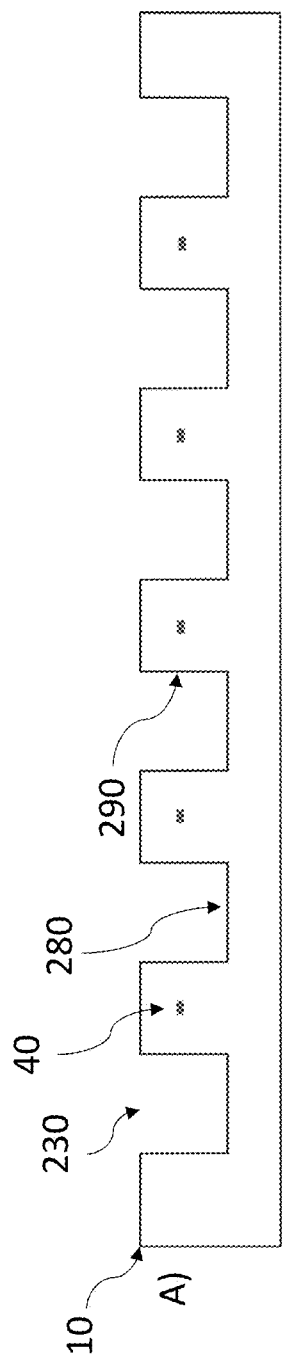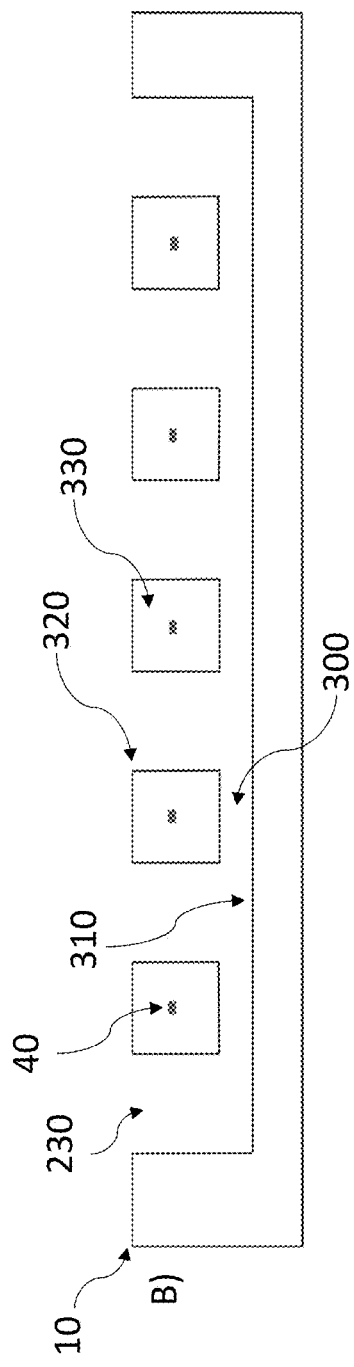

APPARATUS AND METHODS FOR REDUCTION OF CROSSTALK IN INTEGRATED PHOTONICS APPLIED TO ADDRESSING QUANTUM MEMORIES

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the mitigation of scatter in integrated photonics devices with application to reduction of crosstalk between integrated waveguides and the ability to accurately address quantum memories such as a trapped ion system.

OBJECTS AND SUMMARY OF THE INVENTION

The present invention provides new design paradigms for integrated photonic devices that reduce the amount of stray light reaching the output facet such that a higher extinction ratio is created between any two outputs. This is critical for the addressing of quantum memories where crosstalk between intended control signals applied to the desired qubits and stray signals effecting other qubits can lead to decoherence and other detrimental effects.

Briefly stated the present invention discloses methods to redesign any state-of-the-art integrated photonic chip for the desired outcome of reducing cross talk as measured between waveguides spaced such to address a quantum memory system such as but not limited to trapped ions. The invention's methods are not limited to quantum memory applications and can be used similarly to reduce photon induced quasi-particle poisoning in superconducting devices among other applications.

A preferred embodiment of the present invention consists of a Silicon Nitride (SiN) integrated photonic device (also called the chip herein), which can be made compatible with CMOS fabrication methods, consisting of a plurality of waveguides carrying a plurality of wavelengths for the purpose of trapping, addressing and controlling atomic memories. Such waveguides may collect, emit, split, combine, route, distribute, intensity modulate, phase modulate, polarization rotate, or all of the above, the carried light. The preferred embodiment is described in terms of SiN waveguides, but any integrated optical platform such as Silicon on Insulator (SoI), Lithium Niobate (LiNbO), or Aluminum Nitride (AlN) among others can be substituted. The wavelengths used are dependent on the type of memory and can altered. The preferred embodiment described herein assumes a plurality of wavelengths for trapping and controlling a plurality of barium ions, but other quantum memories can be substituted.

On chip scattering has several sources that lead to crosstalk and background modes of propagation on the chip, also known as slab modes. These stray photons can have detrimental effects on the system by acting as background photons, thus reducing the extinction ratio for the optical laser fields that control a quantum memory. The preferred embodiment of the present invention comprises a trapped ion system such as singly ionized Barium 133. Other ionizations or atomic species such as Ytterbium, Barium, Rubidium or Calcium among others or mixtures of such species and ionizations represent minor changes. Each ion in the trap is held in close proximity to its nearest neighbor, usually in a chainlike configuration. The desired delivery system for laser light is such that a single ion is strongly illuminated while no other ion receives any stray light. This implies an extinction ratio of 100% or equivalently zero crosstalk. Such an extinction ratio is not producible in any physical system due to realistic physical properties. However, the goal of maximizing the extinction ratio or equivalently reducing the crosstalk between closely spaced optical beams or waveguides remains an open problem in the state of the art. This high extinction ratio includes the desired wavelengths for controlling the quantum memory as well as removing undesired wavelengths such pump wavelengths for non-linear optics.

Spontaneous parametric down conversion (SPDC), second harmonic generation (SHG) or other non-linear processes can be performed (not depicted) to obtain photons at a desired wavelength. As an example, but not limited to, SPDC from 775 to produce 1550 nm photons. Depending on the material of the chip this can be performed on or off chip by industry standard methods. This can lead to an additional requirement for addressing quantum memories. The pump photons at the undesired wavelength, in our example the 775 nm photons, need to be filtered out of the waveguides to an extremely high degree of approximately −140 dBm. This refers not just to the slab modes around the waveguide but to 775 nm photons that propagate in the waveguides to the output facet.

The present invention features a double escalator configuration that both effectively reduces scatter propagation in general and acts as a wavelength dependent filter. In the preferred embodiment the escalator adiabatically transfers the light from the SiN waveguides to a lower level that contains a plurality of Si based waveguides. The high intensity 775 nm pump photons will be attenuated in the Si waveguide due to the smaller band gap of silicon, while the down converted 1550 nm photons will propagate with minimal loss. This structure acts as a filter reducing the amount of undesired pump light in the propagating waveguide. Different wavelength cut offs can be obtained by varying the material characteristics of the lower waveguide. The light is then returned to the SiN layer via a second waveguide escalator oriented opposite to the first.

The escalators themselves act as wavelength selective filters. The escalators are meticulously designed to maximize the coupling between layers for the desired wavelength or wavelengths. Other wavelengths are not coupled as efficiently and effectively are scattered into the slab. The undesired scattered light would represent a problem for the quantum memory except for the scatter mitigation methods discussed herein. As such the preferred embodiment of the invention may contain a plurality of escalators between a plurality of levels and a plurality of materials to improve isolation and wavelength selectivity. Repeatedly shifting up and down can also remove the scatter from the path of the waveguide thus reducing the amount of scatter at the output facet.

In a preferred embodiment of the present invention, an apparatus for the reduction of crosstalk in integrated photonic devices, the invention comprises a photonic chip substrate having an input facet and an output facet; at least one waveguide disposed in the chip, having its input coincident with the input facet and at least one output coincident with the output facet; a plurality of scatter reduction features, comprising fill, disposed on either side of the waveguide to absorb and block photon propagation; a first plurality of trenches etched in the substrate and disposed on either side of the waveguide so as to create an air gap along the sides of the waveguide that prevents scatter-induced sideways slab mode propagation of light; bridges etched in the substrate and undercut beneath the waveguide so as to create an air gap beneath the waveguide so as to prevent scatter-induced underside slab mode propagation of light; and a second plurality of trenches etched in the substrate extending to the output facet so as to prevent the propagation of slab modes between the at least one waveguide output.

BRIEF DESCRIPTION OF THE DRAWINGS

Industry standard artifacts common to integrated photonic devices including but not limited to; metal fill, edge coupling mode size converters, electrical leads, electrical contact pads, and phase modulators are excluded from all figures for clarity of presentation. The specifics of the layer stack are excluded from all figures as the device fabrication steps vary between manufacturers; but does not affect the function of the invention herein. All figures are not to scale for clarity of presentation. Changes in the above, such as but not limited to; waveguide proportions, waveguide radii of curvature, device materials, number or ordering of device material layers, order or orientation of the components in the preferred embodiment, etc. constitute trivial changes to the invention herein. The laser source or sources and the quantum memory are not shown. The optical coupling apparatus to or from the chip is not shown and any industry standard methods may be used while not affecting the invention herein. Light is assumed to propagate from the left in all figures.

FIG. 5A depicts a simplified side view schematic diagram of the end facet and a cross section showing trenches fabricated between waveguides. These gaps prevent the propagation of slab modes from one waveguide to the next. These gaps can also be filled with material other than air, such as organic polymers for photon adsorption.

FIG. 5B depicts a simplified side view schematic diagram of the end facet and a cross section showing bridges fabricated between waveguides. These gaps prevent the propagation of slab modes from one waveguide to the next.

DETAILED DESCRIPTION OF THE PREFERRED EMBODIMENT

Figure 1:
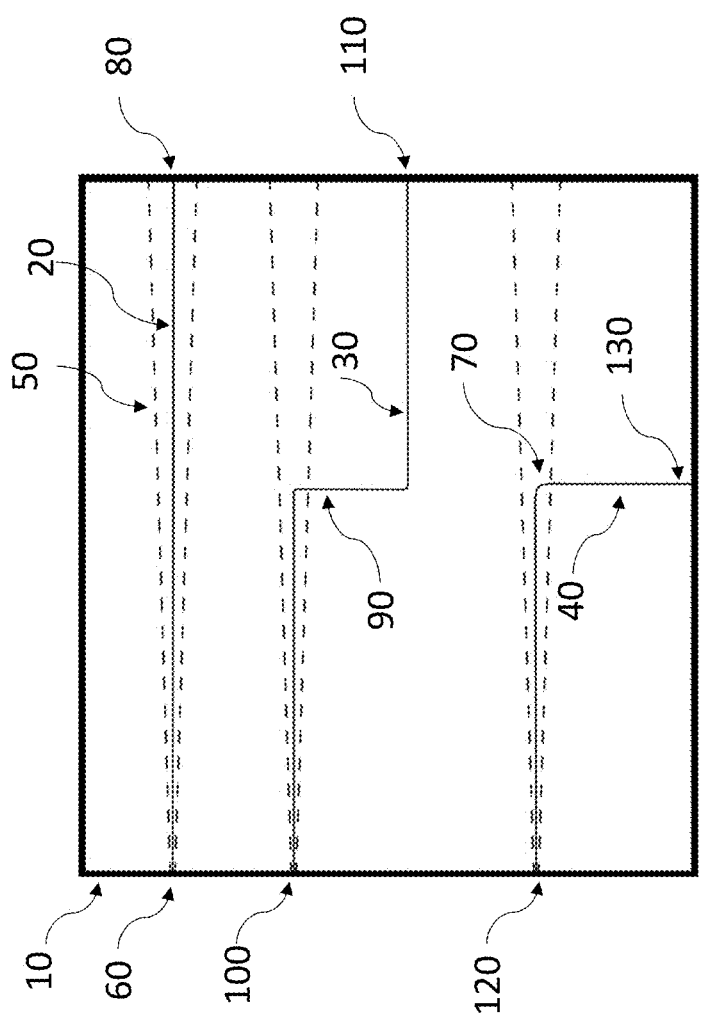
FIG. 1 depicts a simplified top-down schematic diagram of three configurations of waveguides for edge coupling across a chip to a quantum memory. A) A single straight across the chip waveguide, B) an offset waveguide, C) a bent waveguide. Also depicted for clarity by way of dashed lines is a simplified light cone of scatter from the coupling point to the output on each waveguide.

Referring to FIG. 1, depicts a simplified schematic of the top-down view of an integrated photonic device 10, showing three simple waveguides that could be used to deliver light across a chip to a quantum memory. A straight across the chip waveguide 20, an offset waveguide 30, a bent waveguide 40. Light enters the chip from the left. The dashed cone 50 generally depicts the area in which light that is propagating across the chip is poorly coupled from the input point 60 to the waveguides 20. These are one source of slab modes, others include scattering points from on chip devices such as but not limited to, waveguide bends 70, phase modulators, directional couplers, splitters, etc. Waveguide output 80 is within the primary cone of scatter; as such the end facet of the chip surrounding the waveguide is relatively strongly illuminated with scatted photons that may interfere with the quantum memory.

Light from scattering sources such as the input 60 is not strictly confined to the indicated cones 50 and can propagate long distances in the horizontal direction. The solid angle described by the cone 50 is drawn for clarity and can vary. As such a simple modification of waveguide 20 is to offset 90 the input 100 and output 110 such as in waveguide 30. This reduces but does not eliminate the scattered light surrounding the waveguide output 110 at the end facet. The high extinction ratio needed for addressing quantum memories may require additional mitigation.

Figure 6:
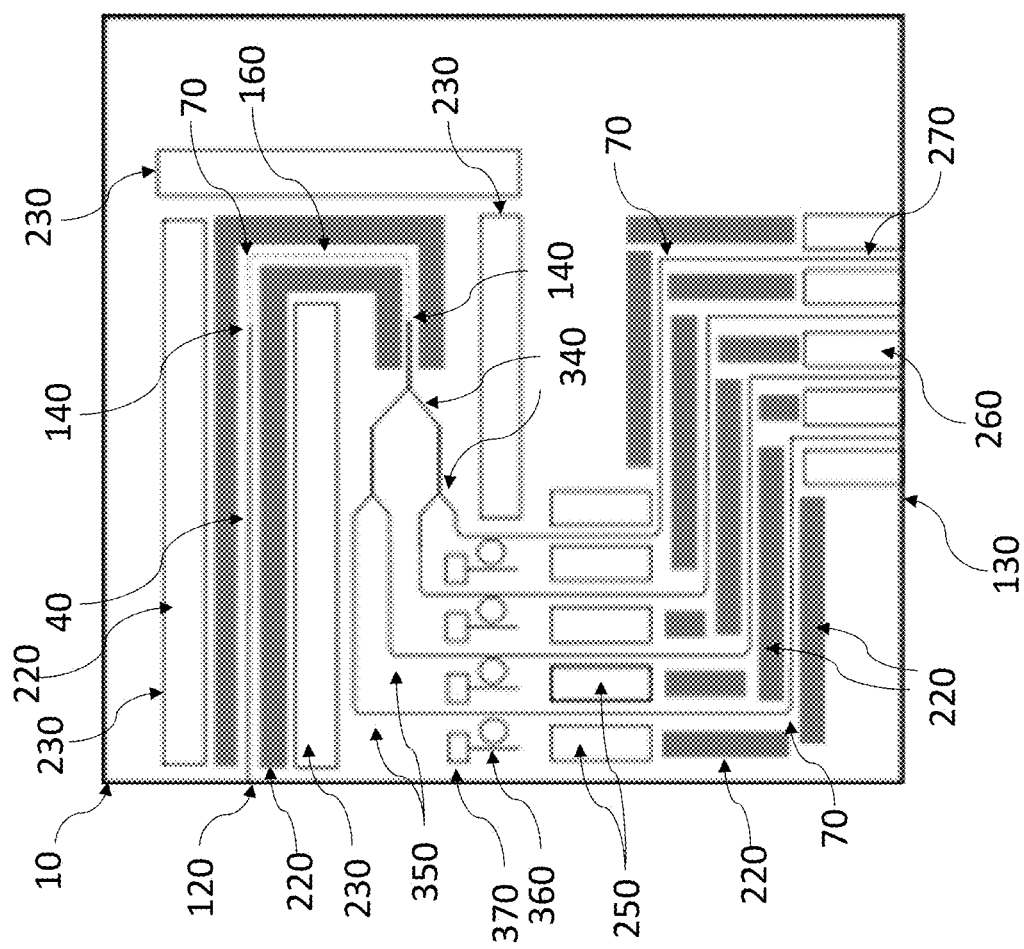
FIG. 6 depicts a simplified schematic overhead view of the preferred embodiment of the present invention combining all of the attenuation methods described in FIGS. 2 through 5 for minimum cross talk between output waveguides.

In a preferred embodiment of the present invention, the optical input 120 of the waveguide 40 is on a facet adjacent (as opposed to opposite) to the output 130. This necessitates at least one bend 70 in the waveguide 40. Similar contours including but not limited to, multiple bends or S-bends, as discussed in FIG. 6 are well within the scope of the present invention. A possible embodiment of the invention includes a waveguide contour that has both input and output on the same facet of an optical chip. This may give the least scatter-to-output coupling available but is a less practical solution, as the apparatus to insert light (not shown) and the apparatus to collect the output or relay it to the quantum memory (not shown) may physically interfere with each other. A preferred embodiment of the present invention is that depicted in FIG. 1 waveguide 40. Note that changes such as 130 emitting through the top facet of the chip via grating coupler or light propagating left to right, would represent an additional feature within the scope of the present invention.

Figure 2:
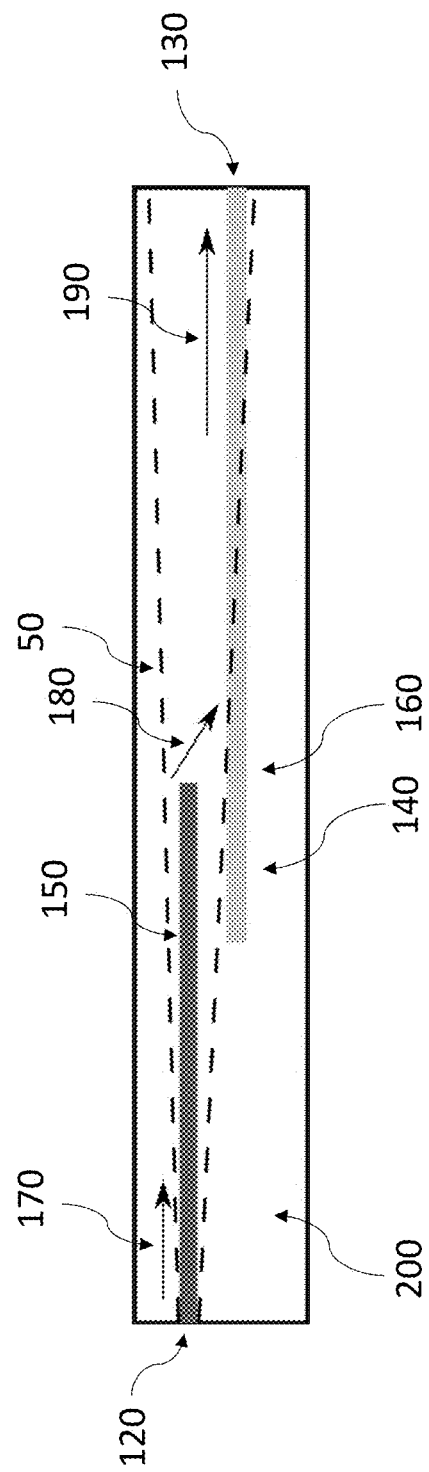
FIG. 2 depicts a simplified side view schematic diagram of an adiabatic waveguide escalator that shifts the level of the light propagating in the chip. In the preferred embodiment of the present invention, this both vertically offsets the waveguide from the majority of the scatter and also changes the material of the waveguide from the SiN layer to a Si layer.

Referring to FIG. 2 depicts a simplified schematic cross section of chip 10 (see FIG. 1) with waveguides on a plurality of levels and materials. The input facet 120 consist of a SiN waveguide layer in a preferred embodiment. An evanescent adiabatic escalator 140, depicted as the overlapped region of the top SiN 150 and bottom Si 160 waveguides. Light propagates from left to right as indicated by arrow 170 and follows an adiabatically descending path 180 at the evanescent escalator. This effects both a vertical offset and wavelength selective filtering. Light 190 emerges vertically offset from the center of the cone of scattering 50 on the end facet 130. FIG. 2 depicts a single escalator however a plurality of sequential escalators can increase the effect of both the filtering and the vertical offset by moving up and or down a plurality of times. The slab 200 refers to the volume cladding material and or handle wafer of the chip. In the preferred embodiment this cladding is SiO2, where light can propagate outside the waveguides while remaining in the chip.

Figure 3:
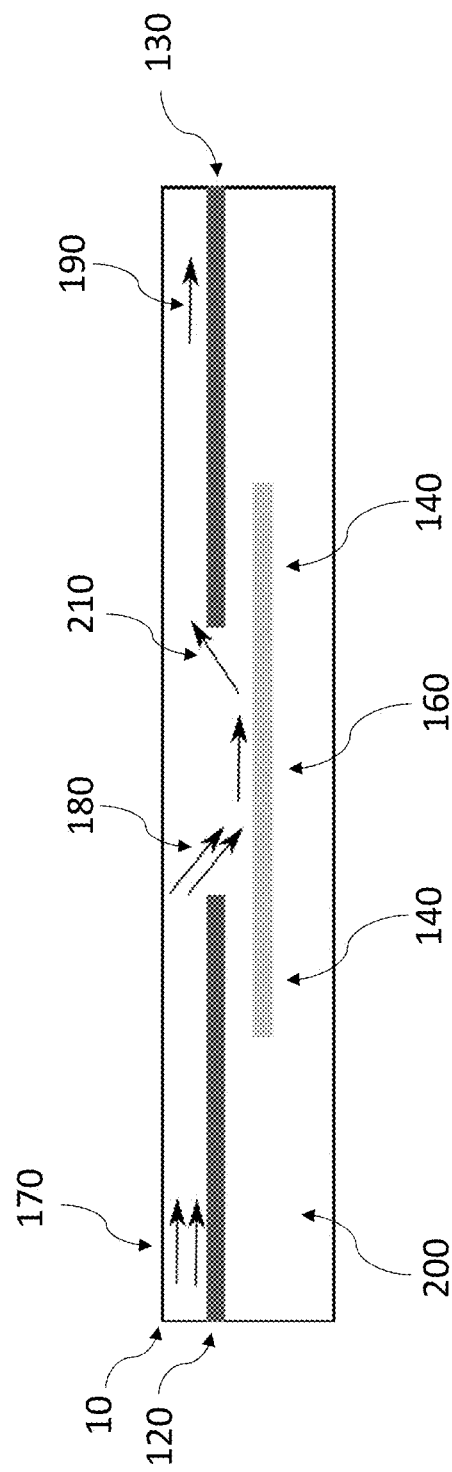
FIG. 3 depicts a simplified side view schematic diagram of two industry standard adiabatic escalators facing opposite directions. In the preferred embodiment of the present invention the lower waveguide is a section of Si waveguides. Here the silicon is itself is used as a filtering material.

Referring to FIG. 3 depicts a schematic cross section of a chip 10, containing a plurality of escalators 140 in series such that the light moves up and down between a plurality of levels multiple times and in the preferred embodiment between a plurality of waveguide materials. Light follows a similar path as in FIG. 2. Still referring to FIG. 3 the two arrows indicated show two different wavelengths having entered the input facet 120 and propagating in the waveguide at point 170 and attempting to take a descending path 180 at the escalator 140. In a preferred embodiment the undesired light is scatted at the escalator 140 and a further portion of undesired light in the Si waveguide 160 is attenuated by the material properties. As such at the second escalator 140 the desired light takes an ascending path 210, enters, and traverses 190 the output waveguide and exits at the output facet 130 while the undesired wavelength is heavily attenuated.

Figure 4:
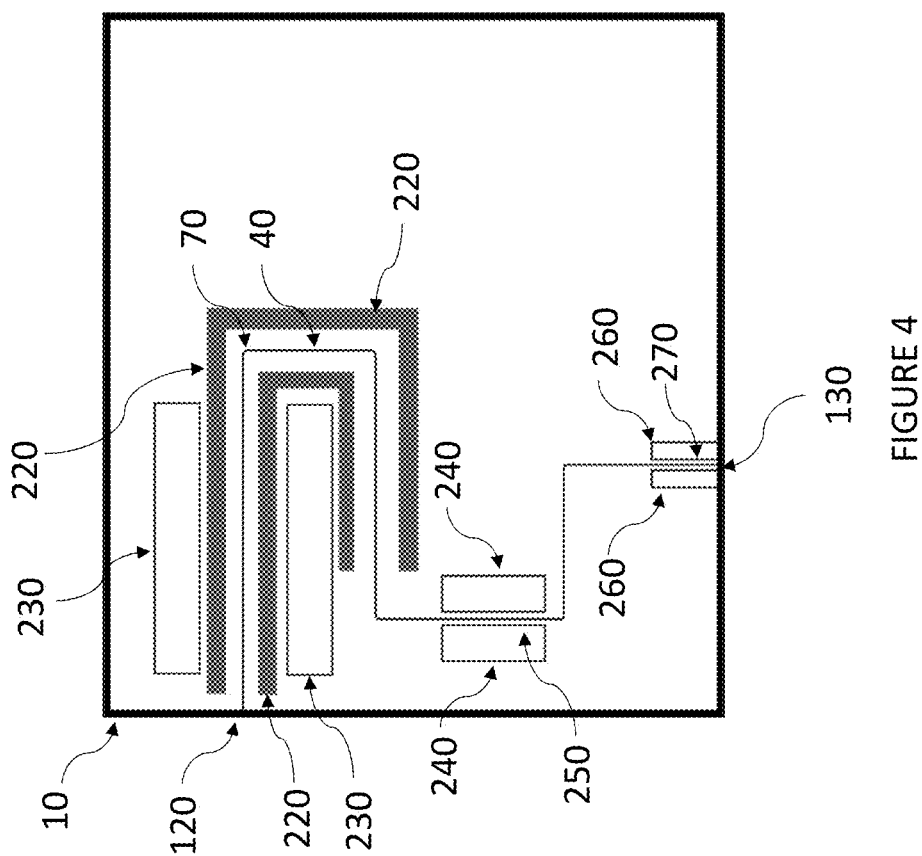
FIG. 4 depicts a simplified top-down schematic diagram of a curved waveguide with multilayer metal fill for the purpose of photon absorption and deep trenches to block scatter propagation.

Referring to FIG. 4 depicts a schematic overhead view of one embodiment of the present invention on chip 10 demonstrating several additional complimentary scatter mitigation methods. Light enters the waveguide at the input facet at 120. The waveguide 40 comprises a plurality of bends 70 and light exits on the adjacent facet at output 130, similar to FIG. 1. On either side of and a short distance away from the waveguide 40 is vertical absorbing fill to create a shield 220. This fill 220 can both absorb and physically block photon propagation. In the preferred embodiment of the present invention this fill 220 is a metal such as aluminum or copper, but other material such as but not limited to semiconductors such as germanium with band gaps smaller than the intended photon wavelength are within the scope of the invention. The metal shield 220 created by the fill is fabricated by creating vias passing vertically though as many layers of the chip 10 as possible, filled with an absorbing material such as metal to form an opaque vertical wall-like structure within the chip 10. The exact characteristics of the metal region may vary including but not limited to height, depth and thickness of the metal, the type of material chosen, and the horizontal distance from the waveguides. The horizontal gap between the waveguide 40 and shield 220 can vary however placing the metal too close to the waveguide 40 can result in high attenuation of the desired light in the waveguide due the evanescent electric field which extends outside the waveguides (not shown) interacting with the shield 220. In an embodiment of the invention herein the metal fill parallels the waveguide 40 or plurality of waveguides along their length and following a plurality of bends 70.

Still referring to FIG. 4 further depicts a complimentary scatter reduction method, 230 represents a plurality of trenches or holes etched from either surface of the chip 10 past the level of the waveguide 40 or equivalently through the chip 10. The preferred embodiment of FIG. 4 uses trenches 230 etched from the top down. This creates an air gap that prevents the propagation of slab modes. The exact size shape, depth and edge geometry of the trench 230 can be varied arbitrarily without effecting this function as long as the depth is sufficiently below the waveguide level to affect the slab modes.

Still referring to FIG. 4, further depicts a complimentary scatter reduction method, a plurality of trenches 240, fabricated similar to 230 are placed in proximity to the waveguide 40. This allows for various etching or other fabrication techniques to remove the substrate material from the volume underneath the waveguide 40. This creates a bridge, alternatively a beam or a membrane 250. The air gap underneath and to the sides prevents the propagation of scatter induced slab modes along the waveguide.

Still referring to FIG. 4, again further depicts a complimentary scatter reduction method, a plurality of trenches 260, fabricated similar to 230 and 240 are placed in proximity to the waveguide 40 and extend to the output facet 130. The trenches 260 prevent the propagation of slab modes between a plurality of outputs 130 at the output facet. This is shown as 230 in cross section FIG. 5A. Similar to the undercut bridge structure 260, the outputs 130 can be undercut by similar fabrication methods to create cantilevered outputs 270. This is shown as 320 in cross section FIG. 5B. Fiber attachment methods can change the structure of the output facet and or undercut region 260 including but not limited to on chip V-groves for fiber alignment or other methods such as those in US Pat. App. Pub. No. 2022/0120976. These modifications are within the scope of the invention and do not affect the function of scatter mitigation for addressing quantum memories herein.

Referring to FIG. 5A depicts a schematic cross section of a chip 10 with a plurality of trenches 230 interleaved with a plurality of waveguides 40. The depth of the trench 280 is such that it extends below the level of the waveguides 40 referenced from the top surface of the chip. The contour of the sidewall of the trench 290 in a preferred embodiment is vertical but other contours including but not limited to sloped or curved edges are functionally equivalent and within the scope of the present invention.

Referring to FIG. 5B depicts a schematic cross section of a chip 10 with a plurality of undercut bridges and or cantilevers 310. In the preferred embodiment the cross section is the same for both structures. The trenches 230 can be fabricated in the same manner as FIG. 5A and as such are labeled the same. The undercut region 300 is created with industry standard etching techniques, such as vapor HF. The depth of the trench 280 and the undercut region 310 are sufficient to prevent evanescent coupling from the waveguide 40 in the bridge 320 into the chip 10 slab below the undercut region 300. A preferred embodiment is shown where the bridge 320 consists of both waveguide and surrounding cladding SiO2 330. The extra cladding 330 provides added strength. The exact volume and cross section of the extra cladding 330 in the bridge 320 may be changed or removed entirely, leaving the waveguide 40 surround by air, a variation well within the scope of the present invention.

Referring to FIG. 6 depicts a schematic top-down view of the preferred embodiment of the invention for the on-chip addressing of quantum memories. The preferred embodiment incorporates all of the scatter mitigation and wavelength selective elements of FIGS. 1-5 with additional components for the splitting of input light and the modulation of said light. A plurality of wavelengths enter the chip via the input facet coupler 120 and propagate in waveguide 40. In the preferred embodiment the light descends an escalator 140 to the Si layer waveguide 160 indicated here by the dotted line and through a plurality of bends 70. The escalator is designed to efficiently transfer all of the desired input wavelengths. In the preferred embodiment the light then returns to the SiN layer waveguide 40 via an additional escalator 140 oriented in the reverse direction, note that waveguide 40 is discontinuous similar to FIG. 3. The light then enters a splitting tree 340. In the preferred embodiment the splitting tree 340 comprises of a plurality of sequential 50/50 Y splitters 340 such that the optical power in the plurality of outputs of the splitting tree 350 is even across all splitting tree 350 waveguides. Replacing the Y splitters with other industry standard power splitting devices including but not limited to tunable Mach-Zehnder Interferometers (MZIs), Multimode Interferometers (MMIs), and ring resonators represent a modification well within the scope of the present invention. The splitting tree output waveguides 350 are then individually modulated for intensity, phase and or polarization. In the preferred embodiment the modulation is accomplished by individually controlled ring resonator-based filters 360 and beam dumps 370. Replacing the ring resonators with other industry standard modulation devices including but not limited to thermal phase modulators, Mach-Zehnder Interferometers (MZIs), or adiabatic polarization rotators also represent a modification well within the scope of the invention.

Still referring to FIG. 6, the light in each splitting tree output waveguide 350 from the modulators 370 in the preferred embodiment then passes through bridges 250 to further reduce scatter induced slab mode propagation of light along the waveguide. In the preferred embodiment the splitting tree output waveguides 350 propagate to the end facet 130 via output couplers 270. The output couplers 270 are divided by trenches 260 for further scatter reduction. The spacing between output couplers 270 provided by trenches 260 is arbitrary and in the preferred embodiment is selected to match the spacing between ions in the given ion trap. This spacing is not a constant and is set by the secular frequency of the ion trap. As such the spacing must be designed for the specific ion trap setup.

Yet still referring to FIG. 6, complimentary scatter reduction methods described herein are additive in their effect. As such the order in which they are arranged is arbitrary and changes in position of elements such as but not limited to escalators 140, bridges 250, metal shielding 220 is a trivial change. Due to the additive effect of the scatter mitigation methods described herein, adding more or multiple instances of each method such as but not limited to adding more shielding 220 around the waveguide 40 is a beneficial within the scope of the invention, albeit a trivial parameter adjustment.

What is claimed is:

1. An apparatus for the reduction of crosstalk in integrated photonic devices, comprising:
    a photonic chip substrate having an input facet and an output facet;
    at least one waveguide disposed in said chip, having its input coincident with said input facet and at least one output coincident with said output facet;
    a plurality of scatter reduction features, comprising:
        fill, disposed on either side of said waveguide to absorb and block photon propagation;
        a first plurality of trenches etched in said substrate and disposed on either side of said waveguide so as to create an air gap along the sides of said waveguide that prevents scatter-induced sideways slab mode propagation of light;
        bridges etched in said substrate and undercut beneath said waveguide so as to create an air gap beneath said waveguide so as to prevent scatter-induced underside slab mode propagation of light;
        a second plurality of trenches etched in said substrate extending to said output facet so as to prevent the propagation of slab modes between said at least one waveguide output;
    wherein said plurality of scatter reduction features further comprises:
        a descending escalator disposed within a path of said waveguide directing light from a first upper SiN layer into a lower Si layer;
        an ascending escalator disposed within a path of said waveguide directing light from said lower Si layer into a second upper SiN layer;
        wherein said first upper and said second upper SiN layers overlap said lower Si layer; and
        wherein said first upper SiN layer, said lower Si layer, and said second upper SiN layer, in combination, produce wavelength selective filtering of light.

2. The apparatus of claim 1, further comprising optical splitters in the path of said waveguide, said optical splitter having a plurality of outputs.

3. The apparatus of claim 2, further comprising means for modulating intensity, phase and polarization of light output from each of said plurality of said optical splitter.

4. The apparatus of claim 1, wherein said fill consists of a metal selected from aluminum or copper.

5. The apparatus of claim 1, wherein said fill consists of a semiconductor.

6. The apparatus of claim 5, wherein said semiconductor comprises germanium.

7. The apparatus of claim 5, wherein said fill is selected from semiconductors having a band gap smaller than an intended photon energy.

8. A method for reducing of crosstalk in integrated photonic devices by fabricating a photonic chip substrate having an input facet and an output facet, by the following steps:
    disposing in said chip at least one waveguide having its input coincident with said input facet and at least one output coincident with said output facet;
        disposing fill on either side of said waveguide to absorb and block photon propagation;
        etching a first plurality of trenches in said substrate and disposed on either side of said waveguide so as to create an air gap along the sides of said waveguide that prevents scatter-induced sideways slab mode propagation of light;
        etching bridges in said substrate and undercut beneath said waveguide so as to create an air gap beneath said waveguide so as to prevent scatter-induced underside slab mode propagation of light;
        etching a second plurality of trenches in said substrate extending to said output facet so as to prevent the propagation of slab modes between said at least one waveguide output;
    disposing a descending escalator within a path of said waveguide directing light from a first upper SiN layer into a lower Si layer;
    disposing an ascending escalator within a path of said waveguide directing light from said lower Si layer into a second upper SiN layer;
    wherein said first upper and said second upper SiN layers overlap said lower Si layer; and
    wherein said first upper SiN layer, said lower Si layer, and said second upper SiN layer, in combination, produce wavelength selective filtering of light.

9. The method of claim 8, further comprising the steps of disposing optical splitters in the path of said waveguide, said optical splitter having a plurality of outputs.

10. The method of claim 9, further comprising the steps of modulating intensity, phase and polarization of light output from each of said plurality of said optical splitter.

11. The method of claim 8, wherein said fill consists of a metal selected from aluminum or copper.

12. The method of claim 8, wherein said fill consists of a semiconductor.

13. The method of claim 12, wherein said semiconductor comprises germanium.

14. The method of claim 12, wherein said fill is selected from semiconductors having a band gap smaller than an intended photon wavelength.

15. An apparatus for the reduction of crosstalk in integrated photonic devices, comprising:
- a photonic chip substrate having an input facet and an output facet;
- at least one waveguide disposed in said chip, having its input coincident with said input facet and at least one output coincident with said output facet;
- a plurality of scatter reduction features, comprising:
- a first plurality of trenches etched in said substrate and disposed on either side of said waveguide so as to create an air gap along the sides of said waveguide that prevents scatter-induced sideways slab mode propagation of light;
- bridges etched in said substrate and undercut beneath said waveguide so as to create an air gap beneath said waveguide so as to prevent scatter-induced underside slab mode propagation of light;
- a second plurality of trenches etched in said substrate extending to said output facet so as to prevent the propagation of slab modes between said at least one waveguide output; and
- at least one non-linear shield having at least one bend configured to absorb and block photon propagation.

16. The apparatus of claim 15, further comprising at least splitting tree connected to a waveguide.

17. The apparatus of claim 15, further comprising at least one resonator filter connected to the waveguide.

18. The apparatus of claim 15, further comprising at least one beam dump connected to a waveguide.

\* \* \* \* \*